UNITED STATES PATENT OFFICE.

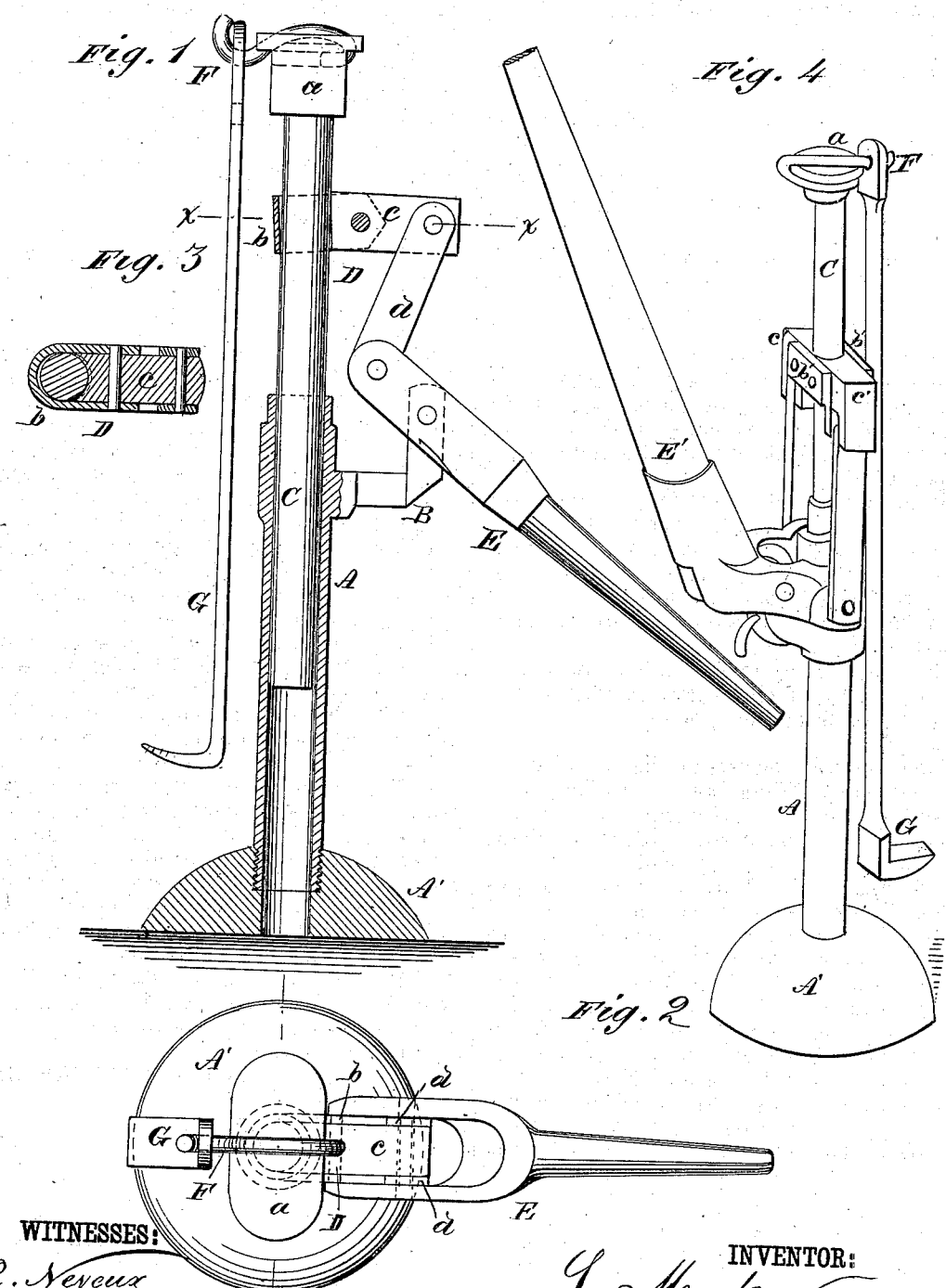

LORENZO MEEKER, OF OSWEGO, NEW YORK.

IMPROVEMENT IN LIFTING-JACKS.

Specification forming part of Letters Patent No. 198,654, dated December 25, 1877; application filed November 20, 1877.

*To all whom it may concern:*

Be it known that I, LORENZO MEEKER, of Oswego, in the county of Oswego and State of New York, have invented a new and Improved Lifting-Jack, of which the following is a specification:

Figure 1 is a side elevation, partly in section, of my improved lifting-jack. Fig. 2 is a plan view. Fig. 3 is a detail sectional view taken on line $x\,x$ in Fig. 1. Fig. 4 is a perspective view of a modified form.

Similar letters of reference indicate corresponding parts.

The object of my invention is to provide a lifting-jack by which a heavy weight may be lifted either from the ground or top of the jack.

The invention consists in the combination of a vertically-sliding bar, a peculiarly-constructed clutching device, and a lever fulcrumed on the tubular standard, by which the vertically-sliding bar is guided.

Referring to the drawing, A is a tubular standard, secured to a base-piece, A', and having the right-angled arm B projecting outward and upward from its side, near the top. A bar, C, having the head $a$, is fitted to the tubular standard A, and upon it is placed a clutch, D, which consists of a strap, $b$, bent around the bar C, and a lever, $c$, pivoted between the ends of the strap. The lever $c$ is connected, by means of straps or connecting-rods $d$, with a bifurcated lever, E, that is fulcrumed on the arm B. The longer arm of the lever E is formed into a handle for operating the jack. The head $a$ is bored transversely, and slotted across its upper surface, to receive a hook, F, for supporting the hooked bar G.

The handle of the lever E is raised, and the head of the bar C is placed against the object to be lifted. By pressing down the long arm of the lever E the lever $c$ is made to clutch the bar C, and the object is raised. If the object is near the surface of the ground, the hooked bar G is employed in raising it, the hook being placed under the object.

In the modification shown in Fig. 4 a bent lever, E', is employed, and two clutch-levers, $c'$, connected by straps $b'$, are used.

Having thus described my invention, I claim as new and desire to secure by Letters Patent—

1. The combination, with the tubular standard and the sliding bar C, of the hand-lever E, the connecting-links $d$, and the clutch D, consisting of a strap partially encompassing the bar C, and a lever or dog, $c$, pivoted to both the connecting-links and the strap, so as to bite the bar C from its movement upon said pivots, substantially as described.

2. The combination of the hook F and hooked rod G with the vertically-sliding bar C of the lifting-jack, substantially as herein shown and described.

LORENZO MEEKER.

Witnesses:
NORMAN HOLLEY,
E. M. FITZGERALD.